United States Patent [19]

Berger, Jr. et al.

[11] 4,124,360
[45] Nov. 7, 1978

[54] COALESCING DEMISTER

[75] Inventors: L. Joseph Berger, Jr., Birmingham; Denis D. Guequierre, Livonia, both of Mich.

[73] Assignee: Finite Filter Co., Inc., Madison Heights, Mich.

[21] Appl. No.: 708,061

[22] Filed: Jul. 23, 1976

Related U.S. Application Data

[63] Continuation-in-part of Ser. No. 593,831, Jul. 7, 1975, Pat. No. 4,078,965.

[51] Int. Cl.² .......................................... B01D 19/00
[52] U.S. Cl. ..................................... 55/187; 55/527; 210/315
[58] Field of Search ............ 210/315, 23, 494, DIG. 5, 210/247; 55/487, 498, 185, 186, 187, 188, DIG. 25, 527

[56] References Cited

U.S. PATENT DOCUMENTS

| | | | |
|---|---|---|---|
| 2,865,510 | 12/1958 | Greene | 210/315 |
| 2,953,249 | 9/1960 | Topol et al. | 210/23 R X |
| 3,048,275 | 8/1962 | Headrick | 210/247 |
| 3,228,527 | 1/1966 | McPherson | 210/315 X |
| 3,262,578 | 7/1966 | Dennis | 210/494 X |
| 3,297,161 | 1/1967 | Kasten | 210/DIG. 5 |
| 3,364,658 | 1/1968 | Walker | 55/421 X |

Primary Examiner—Frank A. Spear, Jr.
Attorney, Agent, or Firm—Dolgorukov & Dolgorukov

[57] ABSTRACT

The specification discloses a novel Coalescing Demister having, depending on the direction of air flow, an inner or outer prefilter-precoalescer subassembly consisting of one or more layers of glass fiber cloth sandwiched between two screen-type retainers, and an inner or outer coalescing subassembly consisting of an inner and outer perforated retainer having a formed glass fiber coalescing media formed there between, together with a layer of synthetic cloth to act as an antichanneling layer, if desired. The prefilter-precoalescer subassembly, and the coalescing subassembly with drain and anti-migration layers are potted between two end caps with suitable openings therein for the normal oil scavenging tubes. An air gap between the two subassemblies is physically maintained by the end caps, and an air flow barrier is provided around the lower periphery of the inner or outer perforated retainer, depending on the direction of air flow, to provide for accumulation of the coalesced liquid and its flow by gravity back through the prefilter-precoalescer subassembly against the air flow.

22 Claims, 16 Drawing Figures

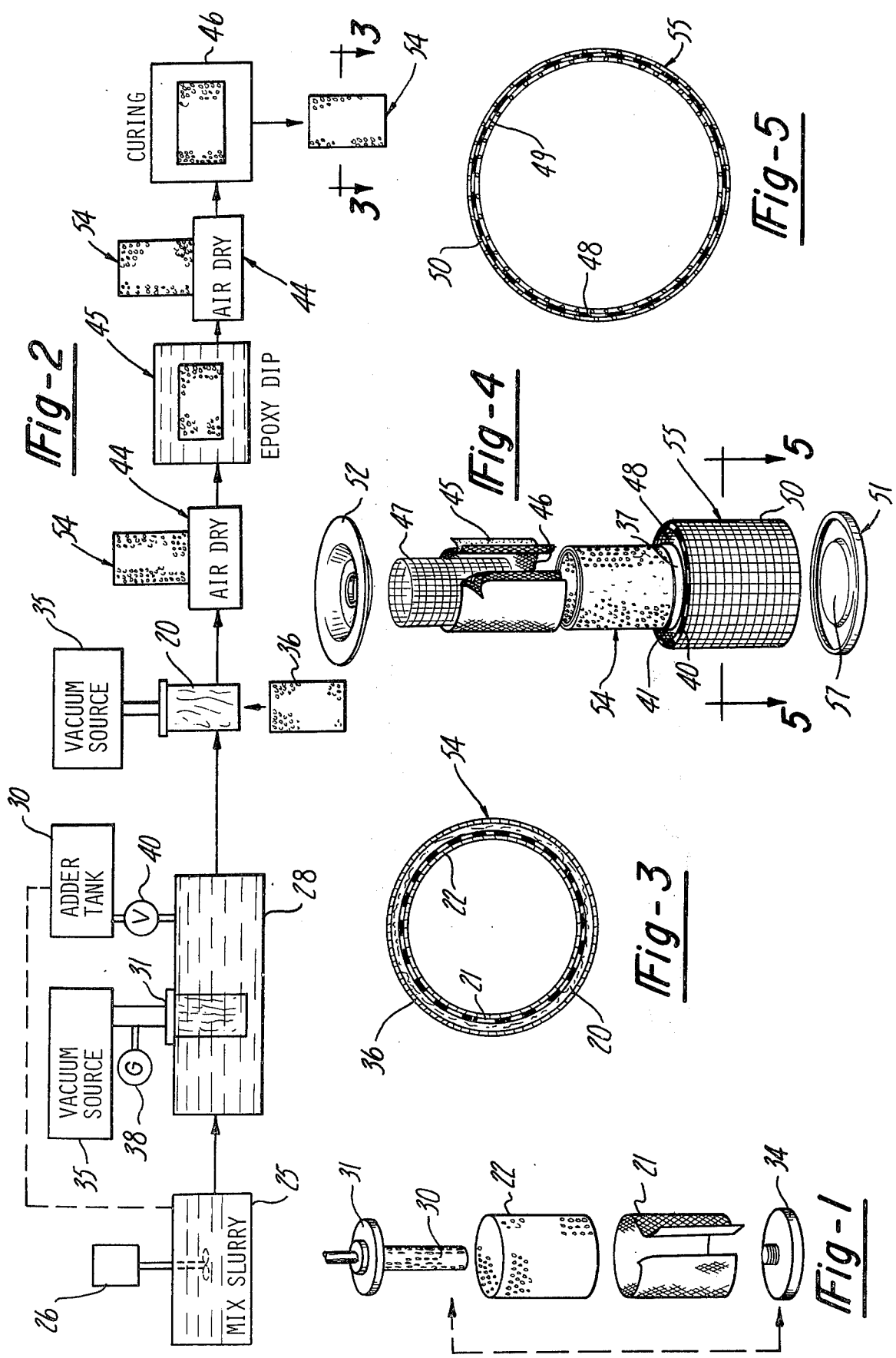

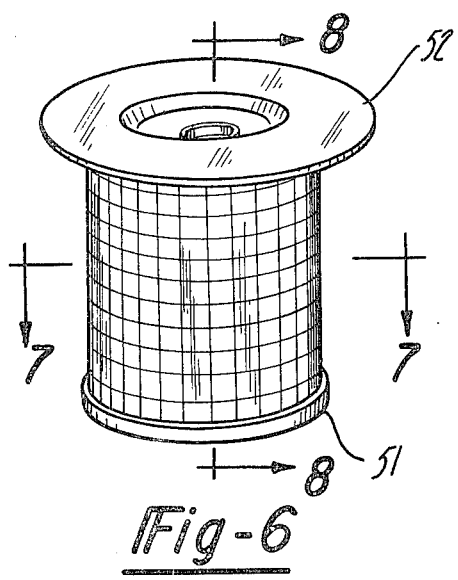
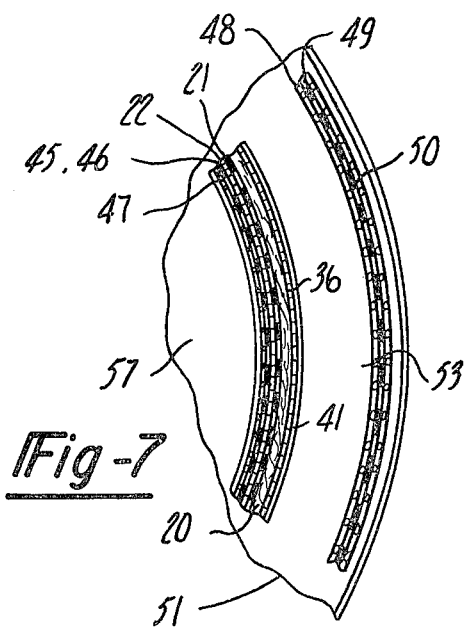
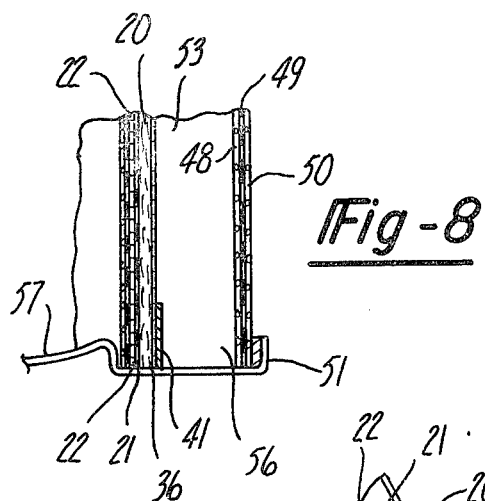
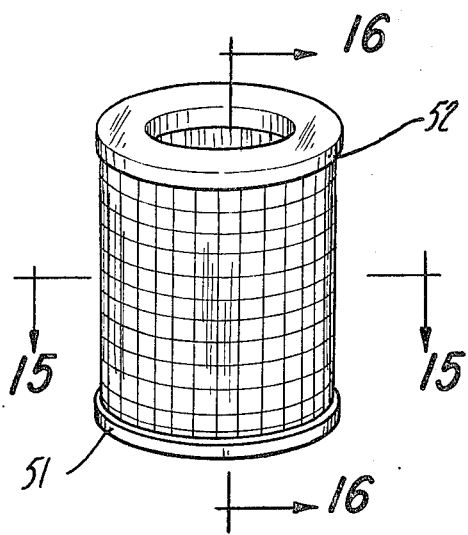
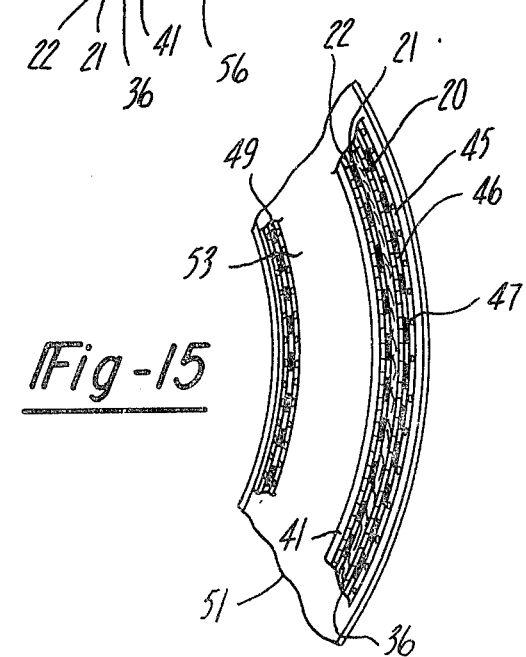
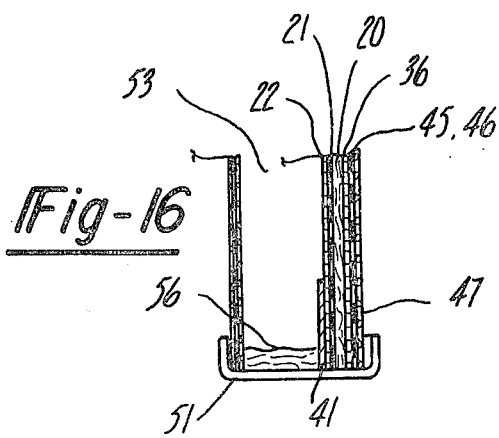

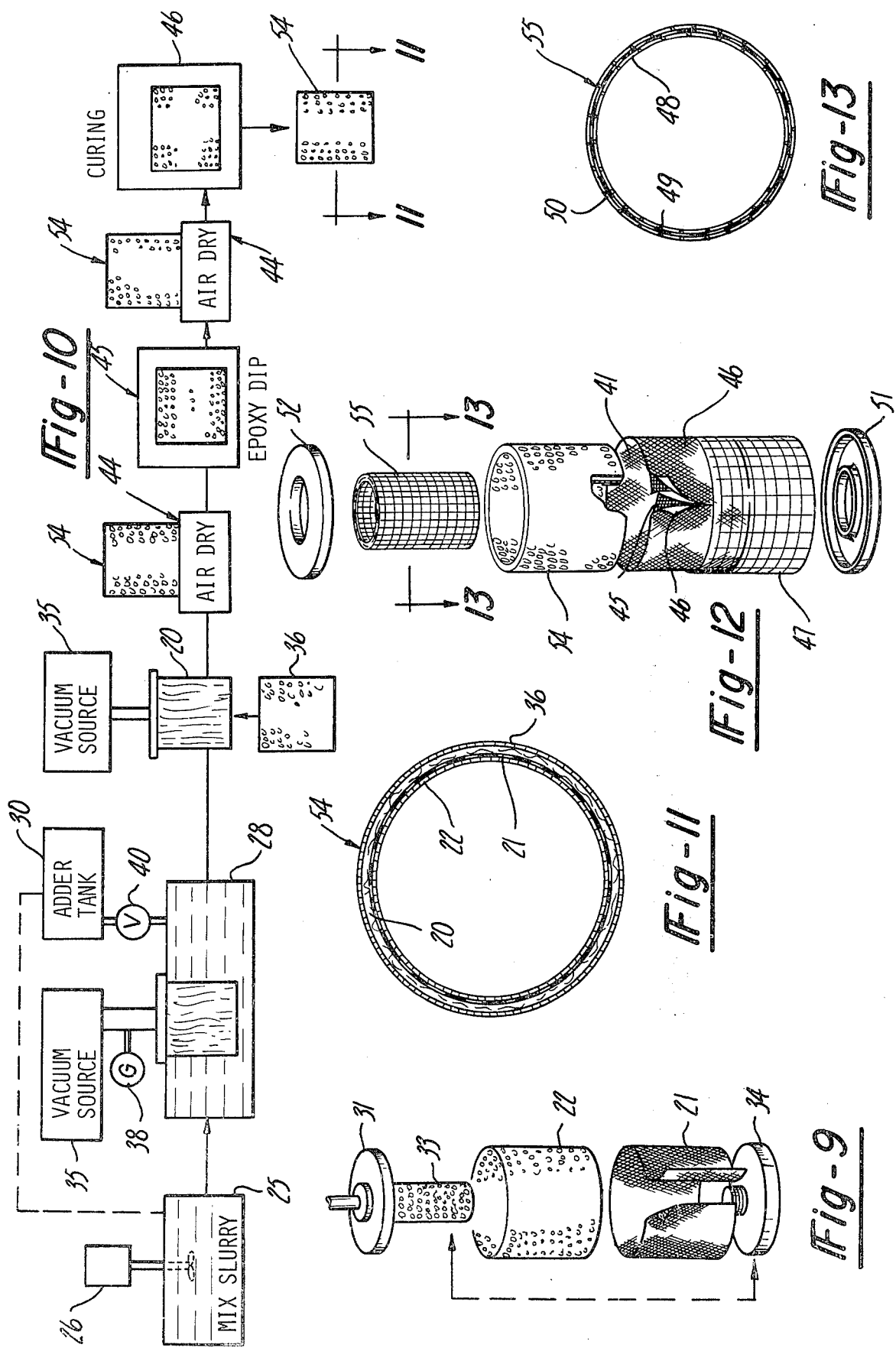

COALESCING DEMISTER

The present application is a continuation in part of our earlier co-pending application, Ser. No. 593,831, filed July 7, 1975, for "Composite Coalescing Filter Tube and Method of Manufacture Thereof", now U.S. Pat. No. 4,078,965.

The present application relates to demisters of the type frequenctly used in air compressors, and in any other application, where it is desired to remove quantities of oil or other liquids which have become entrained in an air or gas stream, and more particularly to a coalescing type demister of the type having a prefilter-precoalescer stage and a regular coalescing stage.

It should be understood that a demister is something rather old in the filter art, with the need for the same being at least as old as the first practical air or gas compressor. The function of the demister is to remove the oil used to lubricate the compressor itself from the compressed air or gas stream leaving the compressor, and to return it to the oil reservoir thereof. Without the use of the demister, the lubricating oil would absent itself from the oil reservoir, resulting in a costly breakdown of the compressor. Further, large amounts of oil in the compressed air or gas stream are very damaging to the operation of many types of air operated machinery, and thus, elimination of entrained oil has been essential for their proper operation.

It is to be noted that the terms "air stream", "gas stream" and "air or gas stream" are used interchangeably throughout the specification, and it is to be further understood that whenever any one of these terms are used, such term should be read as referring to an "oil or gas stream".

Similarly, when the term "compressor" is used, this term should be interpreted to refer to an "air or gas compressor".

In the earlier days of the compressor, wherein low pressures were involved, it was very satisfactory to use a crude demister of the type which just involved passing the air or gas through a fibrous filter material, such as lamb's wool, to remove the largest droplets of oil from the air stream, which were in the neighborhood of 1–50 microns in size. Although the lamb's wool or other material would rather quickly become saturated with oil, such material was inexpensive, and could be easily replaced if required.

However, the development of more and more sophisticated air operated machinery necessitated the development of compressors operating at ever higher pressures and temperatures which rendered such crude demisters totally unuseable and led to research, which is continuing to be present day, directed to making a satisfactory demister which not only removes droplets of oil from the air stream, but which will also remove what is known in the art as "oil mist" or "oil aerosols" from the air or gas stream, which involves oil droplets of 1/10 to 1 micron in diameter.

All of the demisters currently on the market have attempted to provide such a demister by introducing the air stream first to a very tight coalescing media, with the intention that very large drops of oil will form as the air stream passes through such coalescing media, such droplets of oil hopefully containing a major portion of the oil entrained in the air stream, with the air then being passed through a relatively thin drain layer which is provided beyond the coalescing layer, which would again, hopefully, remove additional oil. While this produced a demister which was satisfactory for many purposes, until the present invention the best possible demister, when used in conjunction with the most modern type of compressor, such as the rotary screw type compressor, still left an unsatisfactory amount of oil in the air.

Further, attempts to improve performance of such demisters took the form of providing an air gap between the very tight coalescing layer of the filter and the drain layer in the hope that additional oil would settle out of the air stream during its travel through the air gap. However, it is generally conceded that this hope was not realized, and oil was still left in the air stream in unsatisfactory amounts.

With the advent of such rotary air compressors operating at very high pressure and temperatures, the available demisters became even less desirable, and in some cases it was even found that some component parts deteriorated under the high temperatures and pressures encountered, and this added even more urgency to the search for a demister which would operate satisfactorily under these conditions for a prolonged period of time. We, being already experienced in the art of manufacturing coalescing filter tubes, believed that much the same principles which led to the successful operation of our filter tube could be applied to producing such a demister. In out search for a successful demister we first used the theory of operation of the demister devices currently available which all operate, as previously mentioned, on the theory that you must immediately pass the air stream through a very tight coalescing layer.

In our studies we noted that this method of operation led to the very early complete saturation of these tight coalescing layers, resulting in a decrease of efficiency and early failure.

The demisters which were provided with the air gaps previously discussed had the same problems, and were unsatisfactory for this reason. After much experimentation, we arrived at the conclusion that the theory on which all present demisters operate was basically wrong, and that a prefilter-precoalescer function should be performed, which would remove almost as much oil from the air stream as the much tighter coalescing layer, and would provide for the concentration of the entrained oil in the air stream reaching the coalescing layer to be much less, leaving the coalescing layer free to perform its function much more efficiently, thus resulting in a much lower concentration of oil remaining in the air stream leaving the demister.

In our solution to the problem of providing a satisfactory demister, we thus provided an outer prefilter-precoalescer subassembly through which the air stream must pass before entering a concentrated inner coalescing subassembly. With the provision of suitable end caps and scavenging, it has been found that the oil passing through the prefilter-precoalescer subassembly will drain from the prefilter layer into a reservoir provided in the lower end cap between the coalescing and prefilter-precoalescer subassemblies, and the air, with much oil already removed, will then pass through the coalescing layer, where additional oil will collect in another reservoir. By providing an air flow barrier around the lower periphery of the coalescing layer, the capacity of the first reservoir is increased and the oil has been found to remove itself from the demister by flowing back through the prefilter subassembly against the flow of the air.

Accordingly, one of the objects of the present invention is to provide an improved Coalescing Demister in which the resulting air flow will be of higher cleansed quality.

Another object of the present invention is to provide a Coalescing Demister which has a glass fiber prefilter-precoalescer subassembly which is capable of performing a prefiltering function.

Another object of the present invention is to provide a Coalescing Demister which has a coalescing subassembly that is supported by an inner and an outer rigid support tube.

Another object of the present invention is to provide a unitary glass fiber coalescing subassembly which is supported by an inner and outer rigid support tube having, at the bottom of the subassembly, an air flow barrier which eliminates the problem of flooding both the coalescing filter and the drain layers, and prevents re-entrainment of oil into the cleansed air stream.

A further object of the present invention is to provide a coalescing subassembly which, by virtue of the vacuum forming of a coalescing molded glass micro-fiber layer, will provide an interlocking composite construction of the inner and outer perforated retainers.

A further object of the present invention is to provide a coalescing subassembly of the above nature, with a synthetic fiber lateral channeling layer to prevent the problem of channeling between the portions of the coalescing subassembly, and provide additional strength to the demister itself, preventing damage to it due to flow or pressure fluctuations.

A further object of the present invention is to provide a Coalescing Demister having glass fiber drain and synthetic anti-migration layers as a final cleansing barrier, after the air flow has passed through the coalescing subassembly, which will produce a cleaner out-going air flow.

A still further object of the present invention is to provide a Coalescing Demister which is resistant to rupture due to back pressure and vibration in the filter environment.

A still further object of the present invention is to provide a Coalescing Demister of the foregoing nature which may be easily installed as an original, or replacement filter having either an "Out-to-In" or "In-to-Out" air flow.

A still further object of the present invention is to provide a Coalescing Demister of the foregoing nature which is relatively easy and inexpensive to manufacture.

Further objects and advantages of our invention will be apparent from the following description and appended claims, reference being made to the accompanying drawings forming a part of the specification, wherein like reference characters designate corresponding parts in the several views.

FIG. 1 is an exploded view of the first step in the manufacture of an out-to-in Coalescing Demister embodying the present invention.

FIG. 2 is a diagrammatic view of the process used to manufacture the coalescing subassembly for the out-to-in Coalescing Demister.

FIG. 3 is a sectional view of the coalescing portion of the coalescing subassembly of the out-to-in Coalescing Demister, taken in the direction of arrows on the section line 3—3 of FIG. 2.

FIG. 4 is an exploded view of the assembly sequence for the out-to-in Coalescing Demister.

FIG. 5 is a sectional view of the prefilter-precoalescer subassembly in the direction of the arrows on the section line 5—5 of FIG. 4.

FIG. 6 is a perspective view of our out-to-in Coalescing Demister embodying the present invention, as assembled.

FIG. 7 is a sectional view of an out-to-in Coalescing Demister embodying the present invention taken in the direction of the arrows on the section line 7—7 of FIG. 6 showing the outer prefilter-precoalescer subassembly and the inner coalescing subassembly, and including lateral channeling, glass fiber drain, and anti-migration layers, with an air flow barrier installed about the lower periphery of the coalescing subassembly.

FIG. 8 is a fragmentary sectional view of an out-to-in Coalescing Demister embodying the present invention, showing the air flow barrier with the physical air gap and liquid reservoir taken in the direction of the arrows on the section line 8—8 of FIG. 6.

FIG. 9 is an exploded view of the first step in the manufacture of an in-to-out Coalescing Demister according to the method of the present invention.

FIG. 10 is a diagrammatic view of the process used to manufacture the coalescing subassembly portion of an in-to-out Coalescing Demister embodying the present invention.

FIG. 11 is a sectional view of the coalescing portion of the coalescing subassembly of the in-to-out Coalescing Demister Filter taken in the direction of the arrows on the section line 11—11 of FIG. 10.

FIG. 12 is an exploded view of the assembly sequence for the in-to-out Coalescing Demister embodying the present invention.

FIG. 13 is a sectional view of the prefilter-precoalescer subassembly of the in-to-out Coalescing Demister taken in the direction of the arrows on the section line 13—13 of FIG. 12.

FIG. 14 is a perspective view of an in-to-out Coalescing Demister embodying the present invention, as assembled.

FIG. 15 is a sectional view of our in-to-out Coalescing Demister taken in the direction of the arrows on the section line 15—15 of FIG. 14 showing the prefilter-precoalescer subassembly, the outer coalescing subassembly and the lateral channeling, glass fiber drain, and anti-migration layers.

FIG. 16 is a fragmentary sectional view of an in-to-out Coalescing Demister embodying our invention showing the air flow barrier with the physical air gap and liquid reservoir taken in the direction of the arrows on the section line 15—15 of FIG. 14.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

As is clear from the above description of the drawings, our Coalescing Demister can be made in two forms. The first form is referred to as an out-to-in version, and is so named because of the direction of the air flow, from the outside of the filter assembly to the inside. In this embodiment of our invention, the air, on its travel through the filter, will come in contact with a prefilter-precoalescer subassembly held in place by suitable restraining means, a physical air gap, an air flow barrier, and a coalescing subassembly held in place by suitable means.

The second modification of our invention is an in-to-out demister, wherein the air flows from the interior of the demister to the outside thereof.

The filter layers which the air will encounter on its travel through the in-to-out demister are the same as those just described for the out-to-in demister.

It should be understood that both types of demisters work equally well, and that which type demister to use depends solely on the design requirements of the user.

For ease of understanding, the out-to-in Coalescing Demister and the method used in its manufacture will be described first, with the description of the in-to-out demister to follow. In these descriptions, some of the material from our earlier co-pending application, Ser. No. 593,831, filed July 7, 1975, for "Composite Coalescing Filter Tube and Method of Manufacture Thereof" is repeated for clarity and ease of explanation. To ensure a complete understanding of the present invention, the entire contents of said earlier application, Ser. No. 593,831, is specifically incorporated by reference into the present application.

Referring to FIG. 1, the manufacture of the out-to-in Coalescing Demister begins with the manufacture of the coalescing portion of the coalescing subassembly, generally designated by the numeral 54. This in turn begins with the preparation of the glass fiber slurry in the mixing tank 25.

The slurry used in forming the coalescing layer 20 of the coalescing portion of the coalescing subassembly 54 may be the same as used in the filter tube of our earlier application, and the slurry of glass fibers, water and binder is prepared by first mixing bundles of commercial glass fibers in water with a high speed mixer 26 for about one-half (½) hour, so that the glass fibers will be of lengths of approximately one sixty-fourth to one-half inch in length.

The amount of glass fibers put into the water is sufficient when it forms a mixture of approximately 0.6% by weight of fibers in the water. For example, two (2) pounds of glass fibers in forty (40) gallons of water would provide such a mixture.

It should be understood that the amount of glass fiber added to the water and emulsion binder mixture is not as important as the diameter of the glass fibers, since the percentage of glass fibers in the water emulsion mixture can be as low as 0.1% or as high as 2.0% by weight without affecting the pore size of the coalescing layer 20. It is the pore size that determines the physical characteristics of the coalescing layer, and this is controlled by adjusting the mix of the diameters of glass fibers that are added to the water and emulsion mixture.

For example, a maximum pore size of 12 microns absolute can be obtained by adding equal parts of glass fibers of eight (8) microns and two (2) microns in diameter. This will make a twelve (12) micron absolute coalescing layer, which means nothing bigger than twelve (12) microns will be able to pass through the coalescer while in a liquid form.

The most widely accepted pore size range for the coalescing layer, however, is between eight (8) to four (4) microns absolute, and the choice of the desired size will depend on the viscosity, quantity and surface tension of the liquid you are coalescing.

The desired pore size in the coalescing filter can be obtained with a number of glass fiber mixture portions and varies greatly with the type and percentage by weight relative to the glass fibers of binder that is used.

For example, using a standard binder, at two (2) percent by weight in the relation to the glass fibers, the following portions of glass fibers would be needed for the indicated pore size of the filter layer, viz.

Four (4) microns absolute
16% of 0.5 micron diameter fibers
62% of 1.0 micron diameter fibers
22% of 2.0 micron diameter fibers
Six (6) microns absolute
60% of 1.0 micron diameter fibers
40% of 2.0 micron diameter fibers
Eight (8) microns absolute
22% of 1.0 micron diameter fibers
78% of 2.0 micron diameter fibers Therefore, it is obvious that the slurry mixture will vary greatly depending on the desired pore size of the filter to be formed.

Since several works are available in the art which give information on what mix of glass fiber diameters in a slurry will result in which pore sizes, it is not believed necessary to discuss this matter at any greater length in the present application. However, for the purpose of disclosure, we wish to note that the article entitled "Aerosol filters-Pore size distribution in fibrous filters" by H. W. Piekarr and L. A. Clarenburg, published by the Chemical Laboratory of the National Defense Research Organization T.N.O., Rijswijk Z. H., The Netherlands, is particularly helpful in understanding how glass-fiber filters such as the present one operate, and is incorporated herein by reference.

At this point, it should be understood that the present invention is not limited to the use of glass fibers, but can be used with any other suitable filter material.

Once the slurry is prepared, it is diluted to about 0.15% to 0.20% of glass fibers by weight to the water before being added to the forming tank 28.

The reason for preparing the slurry in the concentrated form, and then diluting it before placement into the forming tank 28, is that the preparation of a concentrated slurry is more efficient, since the size of the mixing tank can be smaller. However, the use of such a concentrated slurry in the forming tank 28 would be impractical because the forming time for any given thickness of coalescing layer would be very short, and the outside diameter of the formed layer would be very hard to control. Since the outside diameter of the formed layer is very important for the reasons to be described, the slurry is diluted, as mentioned above, before being placed in the forming tank. Some of the slurry, for reasons to be described below, is diluted to approximately 0.30% glass fibers by weight, and placed in the adder tank 30.

A synthetic cloth 21, is now securely fastened by either sewing, taping, sealing, etc., around a perforated retainer 22. This synthetic cloth will act as a lateral channeling layer 21 within the coalescing subassembly. This assembly is now placed on a forming fixture 31 having a rigid perforated tube 33, and secured by an end cap 34.

A vacuum from the vacuum source 35 of seven (7) to twenty-five (25) inches of Hg can be applied. Applicant has found that a vacuum of approximately eighteen (18) inches of Hg is most satisfactory for forming the coalescing layer 20 when a slurry consisting of glass fiber with a preferred pore size of six (6) microns absolute is used.

The vacuum actually used will depend upon two factors, the desired speed at which the coalescing layer is to be formed, and the size of shape of the forming tank 28. While the amount of vacuum obtainable will depend on the kind of equipment used, it is important that not too low a vacuum be applied, since the smaller glass fibers will not have an opportunity to migrate to the inside of the coalescing layer. The higher the vacuum that is applied, the faster the slurry will be pulled toward the forming fixture, with the smallest fibers moving the fastest.

Further, the size of the forming tank will also have an effect on the acceptable thickness of the slurry, since a small tank would require a thick slurry, while a large tank would require a thinner slurry, since there is a longer forming time available and, therefore, more effective control during the coalescing layer forming process.

The forming fixture 31 is left in the forming tank 28 until the vacuum gauge 38 shows a predetermined amount of resistance (vacuum) to the flow of the glass fibers has been reached. It should be understood that other methods of regulation of the time the fixture is left in the slurry can be used, such as a straight time controlled interval, etc., but we have found the resistance to flow method to be one which gives a very satisfactory control of the outer diameter of the coalescing filter, which is necessary for reasons to be explained.

The forming fixture 31 is then removed from the forming tank 28 with the vacuum still on. After a short drying time with the vacuum still on, the outer perforated retainer 36, is placed carefully over the coalescing layer 20.

It is important that the rigid outer retainer 36, if one is used, be of the type which is of unitary one piece construction before installation, so it will have the necessary strength. It cannot be one, for example, which is placed around the coalescer layer 20, and then is welded or clipped together.

Once the outer perforated retainer 36, is in place, the vacuum is stopped, the end cap 34 is removed, and the assembly consisting of the inner retainer 22, lateral channeling layer 21, coalescing layer 20 and outer retainer 36 is removed. This is the coalescing portion 54 of the coalescing subassembly.

Once the forming fixture 31 has been removed, the slurry in the forming tank 28 can be replaced as necessary from the adder tank 30 by the control valve 40, and the processing of other coalescing filters can continue.

The adder tank 30 is not necessary, but is preferably provided, as it is desirable to keep the slurry in the forming tank 28, at a constant concentration to eliminate as many variables as possible which may affect the uniformity and quality of the coalescing layer.

As previously mentioned, the slurry in the adder tank 30 has already been diluted to about one-half (½) of the concentration of the glass fiber slurry in the mixing tank 25 for the convenience of the prefilter and filter processing operations.

The coalescing portion of the coalescing subassembly will now be dried. The exact drying time will vary widely depending on the temperature at which the drying operation takes place, as well as the velocity of the drying air. However, a minimum drying temperature of about 200° F. is necessary to turn the emulsion binder in the glass fiber slurry to a solid. It is obvious that this operation can be done many ways. Thus, no particular way of doing this is set out, and the entire operation is generally designated by the numeral 44.

Once the coalescing portion of the coalescing subassembly is air dried, it will be placed into an epoxy dip 45, which is at room temperature, until it becomes saturated. It is then removed from the epoxy dip and once again air dried, this time to remove the solvents from the epoxy. This second air drying operation is done at a slightly lower temperature, about 180° F., than the first air drying operation, due to the flammability of the solvents in the epoxy.

The coalescing portion 54 is then oven cured 46 to provide the necessary strength to permanently hold it together. Note that any suitable epoxy can be used, with the choice depending on the particular use for which the filter is intended.

However, since commercial epoxides are made for paints, it will be necessary to thin them before being used. A suggested thinning range being between ten (10%) and fifty (50%) by weight in relation to the weight of the coalescing layer. The standard practice in the art is to use a thinning ratio of twenty (20%).

The coalescing portion 54 is placed into the curing oven 46 for approximately one-half ½ hour at a temperature of 280° F. Note that the temperature used in the curing oven 46 will depend on the type of epoxy binder used and the types of retaining tubes. For certain applications, it is possible to use plastic inner and outer retaining tubes to surround the coalescing layer 20, and in this case the temperature in the curing oven would be approximately 200° F. rather than the 280° F. which is used when metal retaining tubes are used.

Once the curing 46 is finished, the processing of the coalescing portion 54 is completed, and the assembling of the remaining parts of the Coalescing Demister can begin.

A sectional view of the completed coalescing portion 54 of the coalescing subassembly of the out-to-in Coalescing Demister is shown in FIG. 3, with its four (4) component parts being an inner perforated retainer 22, a synthetic fiber lateral channeling layer 21, a coalescing layer of glass micro-fibers 20, and the outer perforated retainer 36.

If an in-to-out Coalescing Demister were being manufactured, the coalescing portion 54 shown in FIG. 11 would be manufactured in exactly the manner just described. The only possible difference would be the size of the components 22, 21, 20 and 36. These in all likelihood would be larger for the in-to-out demister, but not necessarily so. The size would depend on the application.

The next step in the manufacture of the demister is to install the air flow barrier on the outer perforated retainer 36 at a lower end 37 thereof. This air flow barrier 41 can be made of any nonporous material which would prohibit passage of air.

It should be noted that the air flow barrier need not be attached to the outer perforated retainer, but may take the form of a separate annular band spaced a short distance from the lower edge 37 and held in place by the potting compound. In this manner the filter area behind the air barrier remains active. Whether mounted on the outer retainer, or merely mounted about the lower periphery thereof, we have found that the air flow barrier will prohibit the flooding of the coalescing and drain layers of the filter as previously discussed, and will facilitate the gravitational removal of the oil without re-entrainment into the cleansed air stream. The use of this air flow barrier is a novel improvement over the prior art, and solves a long standing problem therein.

Referring to FIG. 4, the glass fiber drain layer 45 is placed inside the inner retainer 22 in a manner to ensure that there is intimate contact between the drain layer and the inside of the retainer 22.

Next, the anti-migration layer 46, is placed inside the glass fiber drain layer 45 and expanded into place. Once the anti-migration layer 46 is secured, which may be done by any suitable means, a screen-type retainer 47 is placed into position to support the two filter layers. The screen-type retainer 47 may be made of any suitable material which will adequately support the layers 45 and 46 under the particular operating conditions for which the demister is intended.

We have found that the most suitable material to use for the anti-migration layer 46 is a synthetic cloth, although it is to be understood that others can also be used.

Referring to FIG. 12, if an in-to-out Coalescing Demister were being manufactured, the steps of providing the drain layer 45, the anti-migration layer 46 and the screen-type retainer 47 would be substantially similar to those just described, only the sizes of the components, 45, 46 and 47 would be different.

Because of the reversal of the air flow, the anti-migration layer 46 would not come after the drain layer 45 which would now be in intimate contact with the outer retainer tube 35. The screen-type retainer 47 would then be placed around the anti-migration layer 46.

Again referring to FIG. 4, with the layers 45 and 46, and retainer 47 in place inside of the retainer 22, the coalescing assembly is complete.

The prefilter-precoalescer subassemblies of FIG. 5 and FIG. 13 is now assembled. A first prefilter retainer 48 is wrapped with a double layer of glass fiber cloth 49. Once the double wrap of glass fiber cloth 49 is in place, the second prefilter screen-type retainer is provided by wrapping a layer of suitable material around the fiber cloth 49 and fastening it securely by any suitable means such as soldering, the use of metal clips, etc.

With the coalescing and prefilter-precoalescer subassemblies now completed, the out-to-in Coalescing Demister of FIG. 4 may now be assembled. A lower end cap 51, whose shape depends on the particular application in which the demister is to be used, is filled with potting compound.

Since several works are available in the art which give information on the type of potting compound which can be placed in the end cap, it is believed unnecessary to discuss this matter at length in the present application. However, for purpose of clarity, we wish it known that any suitable epoxy, vinyl, phenolic, polyurethane or silicone potting compound, among others, can be used.

Once the end cap 51 has the nonporous adhesive sealer in place, the prefilter-precoalescer subassembly 55 and the coalescing subassembly 54 and the air barrier 41 are potted therein, making certain the edge regions of both subassemblies are completely sealed. The upper end cap 52 is similarly potted in place, with the finished product shown in FIG. 6.

In regard to the assembly of the in-to-out Coalescing Demister, several items where the manufacturing process are different have already been discussed in regard to the coalescing subassembly, the air flow barrier and the prefilter-precoalescer subassembly. Since aside from these differences, the processes involved are substantially similar the manufacture of the in-to-out demister may briefly be set forth by referring to FIGS. 9–12.

Referring to FIG. 9, it is apparent that the manufacture of the "In-to-Out" Coalescing Demister, like the "Out-to-In" Coalescing Demister, begins with the manufacture of the coalescing subassembly and the wrapping of the anti-channeling layer 21 around the enlarged inner retainer 22. The coalescing layer 20 is then formed as before in the slurry tank 28 with the use of the forming fixture 31, end cap 34 and vacuum source 35, taking into account the same factors as to slurry mix, amount of vacuum, replacement of used slurry, etc., as was done in the manufacture of the out-to-in demister just described.

The forming fixture 31 is now removed from the slurry mix with the coalescing layer 20 now formed over the synthetic cloth anti-channeling layer 21, and the outer retainer 36 is installed, thus completing the coalescing portion 54 of the coalescing subassembly.

Since the air flow is from out-to-in in this modification of our invention, the outer retainer 36 may not be required for some applications of our invention, and in this case the inner retainer 22 with the coalescing layer 20 is simply removed from the forming fixture 31 after the vacuum is shut off.

The coalescing portion 54 is now air dried 44, epoxy dipped 45, again air dried 44 and cured 46.

The drain layer 45 is now wrapped around the outside of the outer retainer 36 without fastening, and this in turn is wrapped with an anti-migration layer 46. The layers 45 and 46 are held in place by a screen-type retainer 47 which is fastened securely about the layer 46 by any suitable means.

The air flow barrier 41 is now installed on the inside of the inner perforated retainer 22 at the bottom thereof in the manner previously described.

The prefilter-precoalescer subassembly 55 is now assembled, also as previously described, but is much smaller in size to fit inside the coalescer subassembly and still provide the physical air gap 53.

The coalescing and prefilter-precoalescer subassemblies are now potted to lower 51 and upper 53 end caps and the demister is complete.

Although it is to be understood that our invention is not limited to use in air compressors, but is suitable for use in any application wherein oil entrained in an air or gas stream must be removed, such as oil quenching operations or industrial smoke stacks, for ease of illustration we will now describe the actual operation of our filter in connection with its use in an air compressor.

In actual operation, when the air with entrained oil enters the out-to-in demister through the prefilter-precoalescer subassembly 55 and exits through the coalescing subassembly, if the glass fiber cloth 49 is chosen correctly, so that the pores therein are large enough to allow the air to pass through the filter with the oil entrained therein being coalesced properly, the coalesced oil will now run down the inside of the prefilter-precoalescer because of the nonwicking properties of the material, and collect in the reservoir 56. To prevent the oil in the reservoir from flooding the coalescing subassembly an air flow barrier 41 is provided aroud the lower periphery of the outer retainer 36. While this oil could be scavenged from the reservoir 56 and added feature of our invention is that by the proper choosing of the prefilter media, once the oil reservoir is filled to above the rim of the lower end cap 51 the oil, by the force of gravity, will drain back through the prefilter subassembly 55 and thus drain itself.

The air, with a substantial portion of the entrained oil already removed, then passes through the coalescing portion 54 and through the drain and anti-migration layers 45 and 46, where further oil is coalesced and runs down the inside of the subassembly to collect in the dish shape portion 57 of the end cap, with the air then exiting through the suitable opening in the upper end cap 52. The operation of the in-to-out demister would be substantially similar, except that the oil, instead of collecting in the dish-shaped portion 57, will merely exit through the opening in the end cap and return to the oil sump.

Thus, by abandoning the previous theory of operation of Coalescing Demisters, in which it was felt that the air stream with the oil entrained therein must first pass through as tight a coalescing layer as possible before being passed through a drain layer, and providing a demister having a prefilter-precoalescing stage through which the air is passed before passing through a coalescing filter layer, the objects of the present invention listed above and numerous additional advantages are attained.

We claim:

1. A Coalescing Demister including a prefilter-precoalescer subassembly including at least one layer of a suitable filter material whose properties include being non-wicking and having a pore size properly chosen to coalesce a major portion of the oil entrained in an air stream and still allow gravitational backflow of oil, and a coalescing subassembly having a proper pore size to coalesce virtually all of the oil particles remaining in said air stream after passing through said prefilter-precoalescer subassembly and being concentrically located with respect to said prefilter-precoalescer subassembly and having a physical air gap there between, and having said subassemblies potted between upper and lower end caps to seal the edge regions of said subassemblies to prevent air leakage and to maintain said air gap and including an air flow barrier mounted in an appropriate position on the lower periphery of said coalescing subassembly and having at least one reservoir formed between said air flow barrier and said prefilter-precoalescer subassembly to collect oil and aid said gravitational backflow of oil.

2. The device defined in claim 1, and including an air flow barrier mounted about the lower periphery of said coalescing subassembly.

3. An out-to-in Coalescing Demister including an inner coalescing subassembly including at least one layer of a suitable filter material whose properties include being non-wicking and having a pore size properly chosen to coalesce a major portion of the oil entrained in an air stream and still allow gravitational backflow of oil, and an outer coalescing subassembly having a proper pore size to coalesce virtually all of the oil particles remaining in said air stream after passing through said prefilter-precoalescer subassembly and being concentrically located with respect to said coalescing subassembly with an air gap there between, a lower end cap potted to the lower edge regions of both of said subassemblies and an upper end cap potted to the upper edge regions of said subassemblies to prevent air leakage and to maintain said subassemblies in a concentric relationship, and including an air flow barrier mounted in an appropriate position about the outer lower periphery of said coalescing subassembly and having at least one reservoir formed between said air flow barrier and said prefilter-precoalescer subassembly to collect oil and to aid said gravitational backflow of oil.

4. The device defined in claim 3, wherein said prefilter-precoalescer subassembly includes a first prefilter retainer, at least one layer of suitable glass filter fiber cloth wrapped around said retainer and a second prefilter retainer secured over said glass filter fiber cloth.

5. The device defined in claim 3, wherein said coalescing subassembly includes an inner perforated retainer, a layer of glass fiber cloth suitable for performing the function of an anti-channeling filter layer in intimate contact with said inner retainer, a layer of glass fibers formed over said anti-channeling layer, and an outer perforated retainer placed over said glass fiber coalescing layer.

6. The device defined in claim 5, with said outer perforated retainer being omitted.

7. The device defined in claim 5, wherein said prefilter-precoalescer subassembly includes a first prefilter retainer at least one layer of suitable glass filter fiber cloth wrapped around said retainer and a second prefilter retainer secured over said glass filter fiber cloth.

8. The device defined in claim 7, and including at least one layer of a glass fiber cloth suitable for performing the function of a drain layer in intimate contact with said inner perforated retainer, at least one layer of a synthetic cloth suitable for performing the function of an anti-migration layer in intimate contact with said drain layer, and a screen-type retainer in operative engagement with said anti-migration layer.

9. The device defined in claim 8, wherein said air flow barrier is made of a metallic material.

10. The device defined in claim 8, with said air flow barrier mounted on the lower periphery of said outer perforated retainer.

11. The device defined in claim 10, wherein said air flow barrier is made of plastic tube.

12. The device defined in claim 10, with said outer perforated retainer being omitted, and said flow barrier being mounted about the lower periphery of said glass fiber layer.

13. An in-to-out Coalescing Demister including an inner prefilter-precoalescer subassembly including at least one layer of a suitable filter material whose properties include being non-wicking and having a pore size properly chosen to coalesce a major portion of the oil entrained in an air stream and still allow gravitational backflow of oil, and an inner coalescing subassembly having a proper core size to coalesce virtually all of the oil particles remaining in said air stream after passing through said prefilter-precoalescer subassembly and being concentrically located with respect to said prefilter-precoalescer subassembly with a physical air gap there between, a lower end cap potted to the lower edges of said subassemblies and an upper end cap potted to the upper edges of said subassemblies to prevent air leakage and to maintain the concentric relationship between said subassemblies, and including an air flow barrier mounted in an appropriate position about the inner lower periphery of said coalescing subassembly and having at least one reservoir formed between said air flow barrier and said prefilter-precoalescer subassembly to collect oil and to aid said gravitational backflow of oil.

14. The device defined in claim 13, wherein said coalescing subassembly includes an inner perforated retainer, at least one layer of a glass fiber cloth suitable for performing an anti-channeling function secured in intimate contact with said inner perforated retainer, a coalescing layer of suitable glass fibers formed over said anti-migration layer, and an outer perforated retainer mounted over said coalescing layer in intimate contact therewith.

15. The device defined in claim 13, wherein said prefilter-precoalescer subassembly includes a first prefilter retainer, at least one layer of glass fiber cloth suitable for performing a prefilter-precoalescer function in intimate contact with said first retainer and a second prefilter retainer secured over said glass fiber cloth.

16. The device defined in claim 15, wherein said coalescing subassembly includes an inner perforated retainer, at least one layer of a synthetic cloth suitable for performing an anti-channeling function secured in intimate contact with said inner perforated retainer, a coalescing layer of suitable glass fibers formed over said anti-migration layer, and an outer perforated retainer mounted over said coalescing layer in intimate contact therewith.

17. The device defined in claim 16, with said outer perforated retainer being omitted.

18. The device defined in claim 16, and including at least one layer of a glass filter fiber cloth suitable for performing as a drain layer in intimate contact with said outer perforated retainer at least one layer of a synthetic cloth suitable for an anti-migration layer in intimate contact with said drain layer and a screen-type retainer secured over said drain layer.

19. The device defined in claim 18, wherein said air flow barrier is mounted on the lower periphery of the inside of said inner perforated retainer.

20. The device defined in claim 19, wherein said flow barrier is made of plastic tube.

21. The device defined in claim 19, wherein said air flow barrier is made of a metallic material.

22. The device defined in claim 19, with said inner perforated retainer being omitted, and said air flow barrier being mounted on the lower periphery of said glass fiber layer.

* * * * *